United States Patent [19]

Nishida

[11] Patent Number: 5,433,649
[45] Date of Patent: Jul. 18, 1995

[54] BLADE POSITION DETECTION APPARATUS

[75] Inventor: Tetsuro Nishida, Mitaka, Japan

[73] Assignee: Tokyo Seimitsu Co., Ltd., Japan

[21] Appl. No.: 265,806

[22] Filed: Jun. 27, 1994

Related U.S. Application Data

[62] Division of Ser. No. 933,752, Aug. 21, 1992, Pat. No. 5,353,551.

[30] Foreign Application Priority Data

Aug. 21, 1991 [JP] Japan .................................. 3-209624
Aug. 21, 1991 [JP] Japan .................................. 3-209625

[51] Int. Cl.⁶ ............................................. B24R 49/00
[52] U.S. Cl. .......................................... 451/5; 451/6; 451/8; 83/62
[58] Field of Search ................. 451/1, 5, 6, 8, 9, 10, 451/54, 53, 41; 125/13.01; 83/62; 250/491.1, 206.1, 221, 222

[56] References Cited

U.S. PATENT DOCUMENTS

| | | | |
|---|---|---|---|
| 4,475,320 | 10/1984 | Webster | 451/5 |
| 4,558,686 | 12/1985 | Ono | 125/13.01 |
| 4,566,225 | 1/1986 | Bizot et al. | 451/6 |
| 4,585,372 | 4/1986 | Nagayama et al. | 451/159 |
| 4,679,358 | 7/1987 | Sieradzki | 451/6 |
| 4,794,736 | 1/1989 | Fuwa et al. | 451/6 |
| 5,073,706 | 12/1991 | Kulju | 250/221 |
| 5,117,100 | 5/1992 | Yoshida et al. | 250/221 |

FOREIGN PATENT DOCUMENTS 0439907 8/1991 European Pat. Off. .
2536923 3/1976 Germany .
4023236 1/1991 Germany .
60-123210 8/1985 Japan .
2124365 2/1984 United Kingdom .

Primary Examiner—Maurina T. Rachuba
Attorney, Agent, or Firm—Sixbey, Friedman, Leedom & Ferguson; David S. Safran

[57] ABSTRACT

The front end portion of a rotational blade is accurately located in a non-contact manner although the quantity of wear of the blade has been changed. The structure is so arranged that a pair of prisms are disposed to oppose each other at a predetermined interval, either of the two prisms converges light beams emitted from a light emitting diode within a predetermined interval, and the residual prism again converges the light beams which have been diffused after they have been converged. A photodiode receives beams converged by the other prism. The disturbance light and noise are eliminated by an amplifier so as to fetch only light emitted from the light emitting diode. A blade shields light beams converged at the central portion located at a predetermined interval, while reading devices read the quantity of light received by the photodiode and as well as read the displacement of the blade. A comparator transmits a signal when the quantity of light received by said photodiode agrees with a predetermined value which has been previously stored, so that the front position of the blade is located to correspond to the wear and the like. Additionally, the opposed surfaces of the prisms are kept clean of mist and cutting dust during processing by the jetting of air across them.

3 Claims, 9 Drawing Sheets

BLADE POSITION DETECTION APPARATUS

This is a divisional application of Ser. No. 07/933,752, filed Aug. 21, 1992, now U.S. Pat. No. 5,363,551.

BACKGROUND OF THE INVENTION

1. Field of the Invention

The present invention relates to a blade position detection apparatus, and, more particularly, to a blade position detection apparatus for detecting breakage or wear of a high speed rotational blade of a dicing apparatus for cutting a groove along the street of wafer at the time of manufacturing semiconductors.

2. Description of the Related Art

It is an important factor to allow the quantity of a wafer work left from a groove cutting operation performed by a dicing apparatus to agree with a predetermined value.

In order to allow the quantity left from the operation of cutting wafer to agree with a predetermined value, the location of the Z-axis and the repetition of the location must be performed accurately and as well as the quantity of wear of the blade must be detected so as to be corrected.

The following two methods have been known to correct the quantity of the wear of the blade. First of all, a method has been known in which the blade is brought into contact with a machining table after a predetermined number of grooves have been cut in the wafer and then electricity is applied to the blade and the machining table so as to correct the blade. Another method has been known in which data (an empirical value) about the quantity of the wear of the blade is previously input as an automatic wear correction quantity to the dicing apparatus.

However, the former method encounters a problem that the blade can be damaged because the blade is brought into contact with the machining table, and what is worse, another problem arises in that the machining table is damaged. On the other hand, the latter method raises another problem in that the empirical value cannot be adapted to the variation of the quantity of the wear of the blade taken place depending upon the conditions such as the type of the wafer to be machined, the scattering of the blades and the quantity of cutting.

SUMMARY OF THE INVENTION

Accordingly, an object of the present invention is to provide a blade position detection apparatus capable of accurately locating the front portion of a blade even if the quantity of wear of the blade has been changed due to the conditions such as the type of wafer to be machined, the scatter of the blades, and the quantity of cutting, and the like.

In order to achieve the aforesaid object, according to one aspect of the invention, there is provided a blade position detection apparatus comprising: light emitting means; light receiving means for receiving light emitted by the light emitting means so as to photoelectrically convert received light; noise eliminating means which receives a signal transmitted from the light receiving means, and which eliminates, from the signal, disturbance light except for light emitted by the light emitting means and electric noise so as to output the signal; first detection means for detecting the portion of the front position of a rotational blade to be inserted into a position between the light emitting means and the light receiving means; second detection means for, in accordance with the output from the noise eliminating means, detecting that the rotational blade has been inserted into a predetermined position between the light emitting means and the light receiving means; and means for receiving the position of the front portion of the rotational blade detected by the first detection means at the time of the detection made by the second detection means; wherein the front position of the rotational blade is located with respect to a subject to be machined in accordance with the received position of the front portion of the rotational blade.

According to the present invention, the emitting surface and the incidental surface are disposed to oppose each other at a predetermined interval. The light emitting means emits light from the emitting surface. The light receiving means receives light made incident on the incidental surface so as to photoelectrically convert it. Furthermore, means for eliminating disturbance light received by the light receiving means and generating noise is provided so that only light emitting from the light emitting means is transmitted from the light emitting means.

In order to achieve the aforesaid object, according to one aspect of the invention, there is provided a blade position detection apparatus having light emitting means having a transparent emitting surface and emitting light via the emitting surface, light receiving means having a transparent incidental surface positioned to oppose the emitting surface at a predetermined interval and receiving light made incident via the incidental surface so as to photoelectrically convert the light, first detection means for detecting the position of the front portion of a rotational blade to be inserted into a position between the light emitting means and the light receiving means, second detection means for, in accordance with an output from the light receiving means, detecting that the rotational blade has been inserted into a predetermined position between the light emitting means and the light receiving means; and means for receiving the position of the front portion of the rotational blade detected by the first detection means at the time of detection performed by the second detection means, so that the front end portion of the rotational blade is located with respect to a subject to be machined in accordance with the received front position of the rotational blade, the blade position detection apparatus comprising: means for storing voltage signal V and displacement Z of the rotational blade obtainable from the light receiving means whenever the rotational blade is moved by a predetermined quantity in a direction in which light converged within an interval between the optical systems is shielded in a case where voltage signal V0 obtainable from the light receiving means when the rotational blade is positioned at a position at which light is not shielded substantially agrees with voltage signal V1 when the emitting surface and the incidental surface, which have been previously stored, are kept clean; means for obtaining the relationship between the stored voltage signal V and the displacement Z of the rotational blade; and means for discriminating a fact that the emitting surface and the incidental surface are clean in a case where the obtained relationship substantially agrees with the relationship between voltage signal V and position Z of the rotational blade realized when the emitting surface and the incidental surface are clean, wherein the received position of the front end of the rotational blade is effective.

According to the present invention, in a case where voltage signal V0 obtainable from the light receiving means when the rotational blade is positioned at the position at which it does not shield light substantially agrees with voltage signal V1 which has been stored and which is obtainable when the emitting surface and the incidental surface are kept clean, the storage means stores the voltage signal V obtained from the light receiving means whenever the rotational blade is moved by a predetermined quantity in a direction in which light beams converged within the interval between the optical systems is shielded and the displacement Z of the rotational blade. The discrimination means discriminates that the emitting surface and the incidental surface are clean when the relationship between the stored voltage signal V and he displacement Z of the rotational blade obtained by the means for obtaining the aforesaid relationship substantially agrees with the relationship between the voltage signal V and the position Z of the rotational blade when the emitting surface and the incidental surface are clean. As a result, the received position of the front portion of the rotational blade is made to be effective.

In order to achieve the aforesaid objects, according to the present invention, there is provided a blade position detection apparatus having light emitting means having a transparent emitting surface and emitting light via the emitting surface, light receiving means having a transparent incidental surface positioned to oppose the emitting surface at a predetermined interval and receiving light made incident via the incidental surface so as to photoelectrically convert the light, first detection means for detecting the front portion of a rotational blade to be inserted into a position between the light emitting means and the light receiving means, second detection means for, in accordance with an output from the light receiving means, detecting that the rotational blade has been inserted into a predetermined position between the light emitting means and the light receiving means; and means for receiving the position of the front portion of the rotational blade detected by the first detection means at the time of detection performed by the second detection means, so that the front end portion of the rotational blade is located with respect to a subject to be machined in accordance with the received of the front portion position of the rotational blade, the blade position detection apparatus comprising: washing means for jetting water and air to the emitting surface and the incidental surface, wherein the washing means jets water at the time of machining so as to form a water film on the emitting surface and the incidental surface, so that an adhesion of cutting dust generated at the time of machining is prevented, and jets air at the time of detecting the position of the rotational blade so as to remove water droplets allowed to adhere to the emitting surface and the incidental surface.

According to the present invention, the washing means is able to prevent the problem that mist including cutting dust generated during the work machining process adheres to the emitting surface and the incidental surface. Therefor, the emitting surface and the incidental surface can be kept clean, so that light quantity introduced to the light receiving means can be maintained at a constant quantity.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENT

Detailed description will hereunder be given of the preferred embodiment of a blade position detection apparatus according to the present invention with reference to the accompanying drawings.

Figure 1:
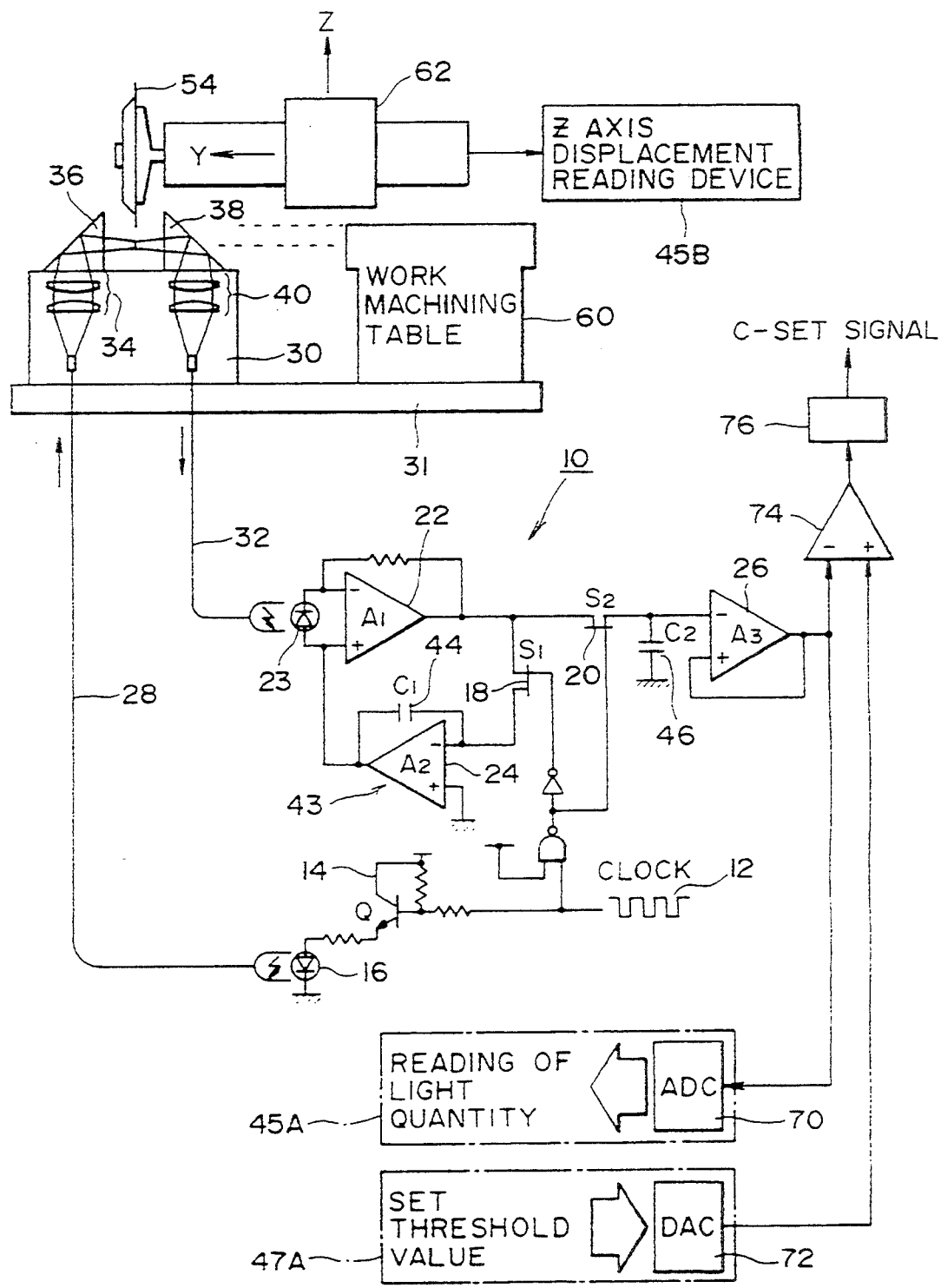
FIG. 1 is a schematic view which illustrates a blade position detection apparatus according to the present invention.

As shown in FIG. 1, a clock 12 of a blade position detection apparatus 10 turns on a transistor 14 when the level of the clock 12 is low, so that a light emitting diode 16 is turned on, and simultaneously, a first FET (field effect transistor) 18 is switched off and a second FET 20 is switched on. On the contrary, the clock 12 turns off the transistor 14 when the level of the clock 12 is high, so that the light emitting diode 16 is turned off, and simultaneously, the FET 18 is turned on and a second FET 20 is turned off. As a result, the light emitting diode 16 is turned on and off at the period of he clock 12 so as to alternately switch the case between a case where the output from an ope-amplifier 22 to be described later is connected to an amplifier 24 and a case where the same is connected to an amplifier 26.

An end portion of an optical fiber 28 is disposed adjacent to the light emitting diode 16, while another end of the same is connected to an inspection table 30. The inspection table 30 is disposed on a base 31, the inspection table 30 having a lens system 34 above the other end portion of the optical fiber 28. Furthermore, prisms 36 and 38 are disposed on the upper surface of the inspection table The prism 36 is disposed above the lens system 34, while a lens system 40 is disposed below the prism 38. Furthermore, an end portion of an optical fiber 32 is disposed below the lens system 40, while another end portion of the same is disposed adjacent to a photodiode 23 of the aforesaid ope-amplifier 22. Hence, light emitted from the light emitting diode 16 is incident on the lens system 34 via the optical fiber 28. Light refracted by the lens system 34 is reflected by the prism 36 and is condensed in the prisms 36 and 38. Condensed light is reflected by the prism 38 before it is refracted by the lens system 40. Then, refracted light is incident on the end portion of the optical fiber 32. The photodiode 23 of the ope-amplifier 22 is irradiated with light which has been incident on the end portion of the optical fiber 32. Simultaneously, disturbance light reaches the photodiode 23.

The negative input of the ope-amplifier 22 receives a signal which has been photoelectrically converted by the photodiode 23. The aforesaid signal includes an electric signal of light emitted from the light emitting diode 16 and an electric signal of disturbance light. On the other hand, the positive input of the ope-amplifier 22 is supplied with offset voltage from a mirror integrating circuit 43 constituted by the amplifier 24 and a capacitor 44, the offset voltage being obtained when the light emitting diode 16 has been turned off.

Figure 2:
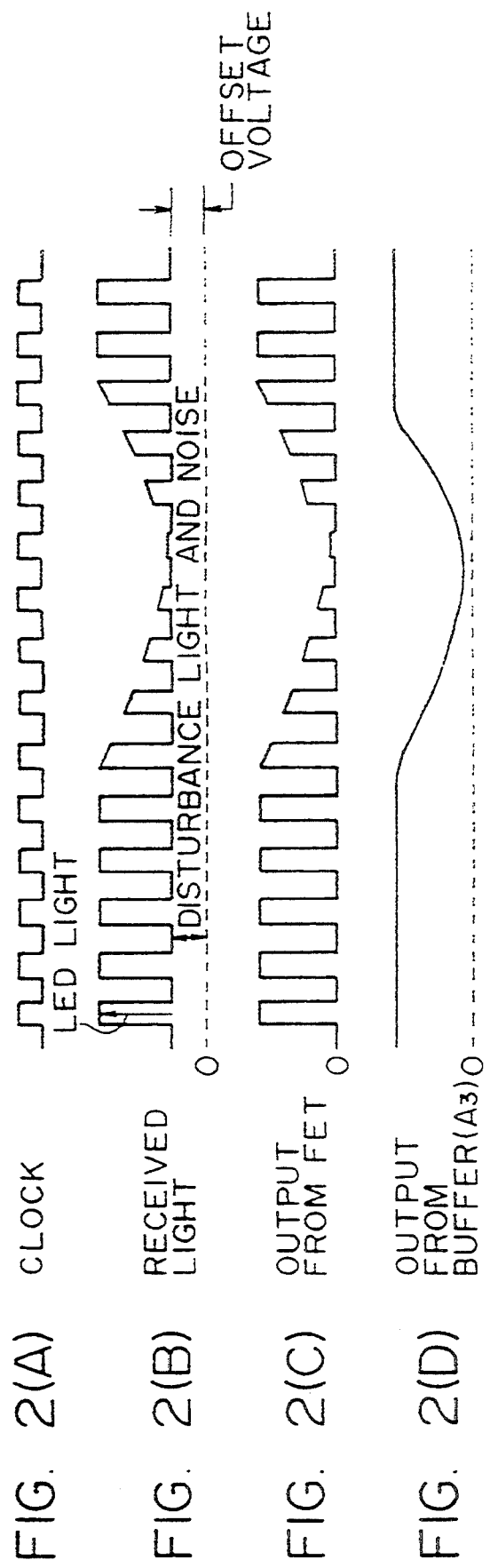
FIG. 2 illustrates states of operations of the elements of the blade position detection apparatus according to the present invention.

That is, when the light emitting diode 16 is turned off, only disturbance light is incident on the photodiode 23. The photodiode 23 generates photoelectric motive force which corresponds to the disturbance light. The photoelectric motive force is amplified by the ope-amplifier 23 before it is stored in the mirror integrating circuit 43 vie the FET 18. The output from the integrating circuit 43 is applied to the positive input of the ope-amplifier 23 as offset voltage when the light emitting diode 16 is turned on. Incidentally, the aforesaid offset voltage includes the electric signal of the disturbance light and electric noise generated in the ope-amplifier 22, and the like (see FIG. 2(B)).

Therefore, when the light emitting diode 16 is turned on, the FET 18 is turned off and the FET 20 is turned on. However, since the positive input of the ope-amplifier 22 is being applied with the offset voltage, the ope-amplifier 22 removes the disturbance light and the electric noise and the like and transmits an electric signal of only light of the light emitting diode 16, the electric signal being applied to a capacitor 46 via the FET 20 (see FIG. 2(C)). As described above, the capacitor 46 stores the outputs from the ope-amplifier 22 whenever the light emitting diode 16 is turned on. Hence, a buffer amplifier 26 transmits a signal as designated by a curve shown in FIG. 2(D)).

The signal transmitted from the buffer amplifier 26 is read out via an AD converter 70 of a light quantity reading means 45A and is also supplied to a comparator 74. The comparator 74 subjects the signal transmitted from the buffer amplifier 26 and a signal denoting a threshold value and transmitted from a storage circuit 47 to a comparison, and the comparator 74 transmits a signal to a one-shot 76 when the two signals have agreed to each other. The one-shot 76 transmits a C-SET signal in response to a signal transmitted from the comparator 74. Incidentally, the storage circuit 47 previously stores the threshold value which is arranged to be transmitted to the comparator 74 via a DA converter 72.

A blade 54 is disposed above the prisms 36 and 38, the blade 54 being rotatively fastened to a movable device 62. Since the movable device 62 is able to move in the Y-axial direction and the Z-axial direction, the blade 54 is able to move in the Y-axial direction and the Z-axial direction. The movable device 62 has a blade displacement reading device 45B so as to read the Z-axial directional displacement of the blade 54. Incidentally, the X-axis directional movement is performed by the base 31.

Figure 3:
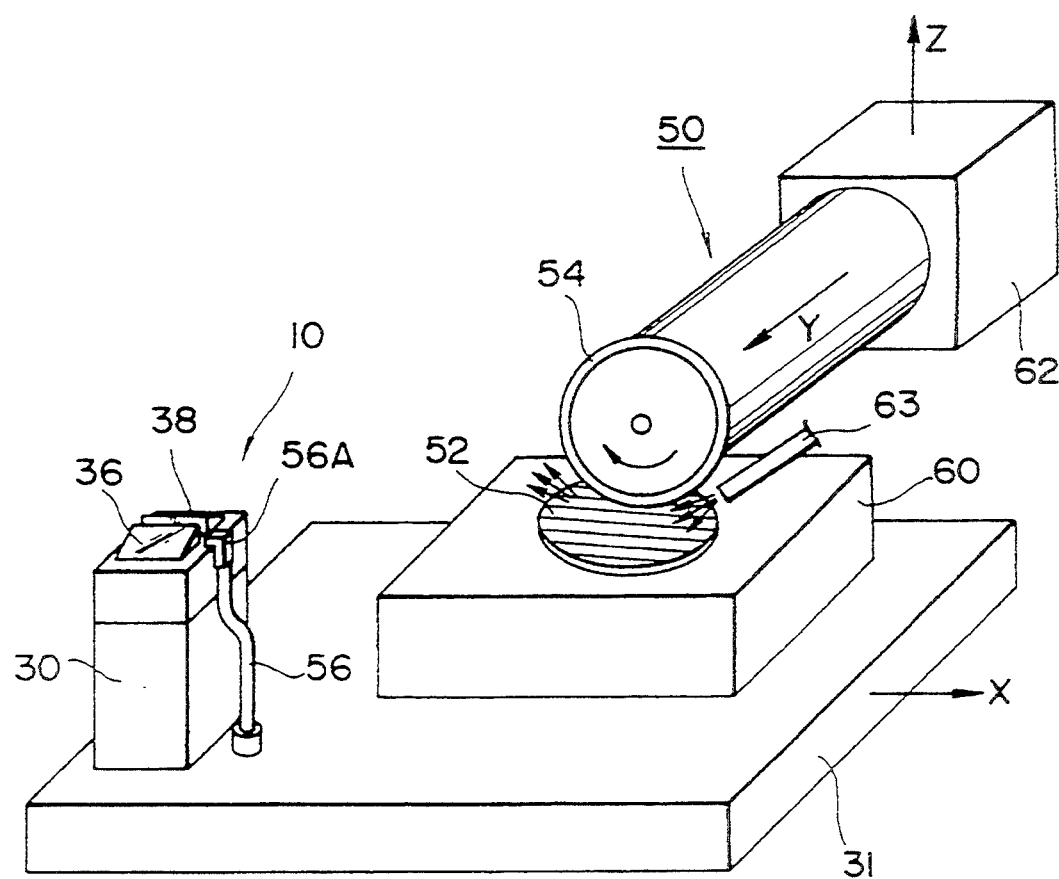
FIG. 3 is a perspective view which illustrates a state where wafer is machined by a dicing apparatus with the blade position detection apparatus.
Figure 4:
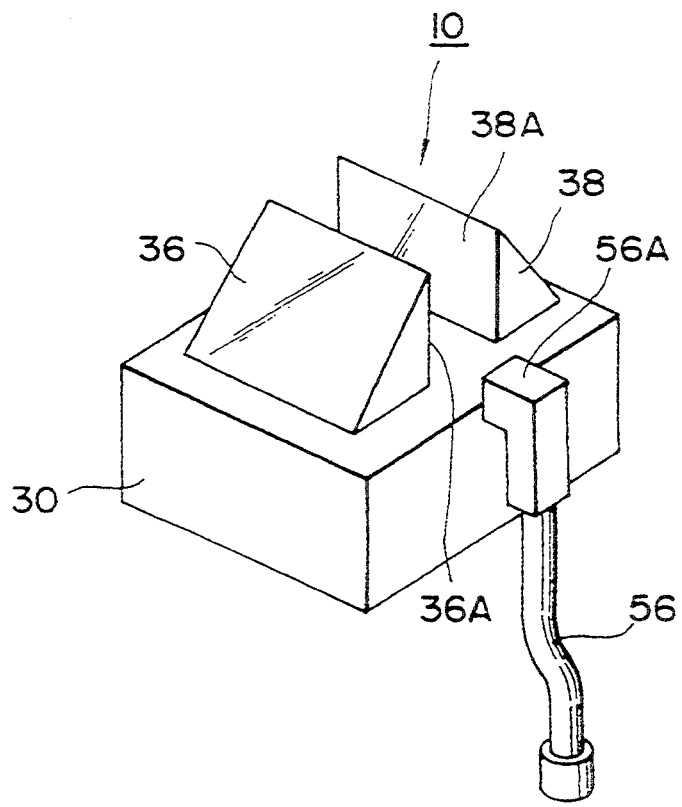
FIG. 4 is an enlarged view which illustrates an essential portion of the blade position detection apparatus according to the present invention.

FIG. 3 illustrates a state where a wafer 52 is being machined by the dicing apparatus 50. FIG. 4 is an enlarged view which illustrates an essential portion of the blade position detection apparatus 10. As shown in FIGS. 3 and 4, a pipe 56 for supplying water or air is disposed adjacent to the inspection table 30, the pipe 56 having a nozzle 56A at the front portion thereof. In the process of machining the wafer 52 as shown in FIG. 3, water is ejected from the nozzle 63 so as to be supplied to a position at which the wafer 52 is being machined by the blade 54. As a result, the blade 54 is cooled down and the cutting facility can be maintained.

Figure 5:
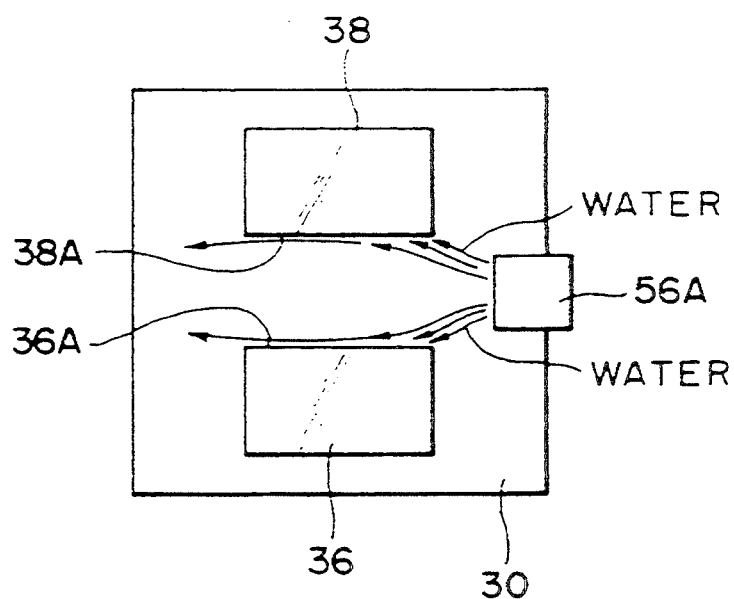
FIG. 5 is a plan view which illustrates a state where opposite surfaces of a pair of optical prisms of the blade position detection apparatus according to the present invention are watered.

Since the blade 54 is rotated at high speed during the machining operation, cutting dust of the wafer 52 generated due to the machining is formed into mist which is present around the machining position. Therefore, water is ejected from the nozzle 56A via the pipe 56 of the blade position detection apparatus 10 in this case so as to form a water film on opposing surfaces 36A and 38A of the prisms 36 and 38 (see FIG. 5). As a result, the mist does not adhere to the opposing surfaces 36A and 38A of the prisms 36 and 38.

Figure 6:
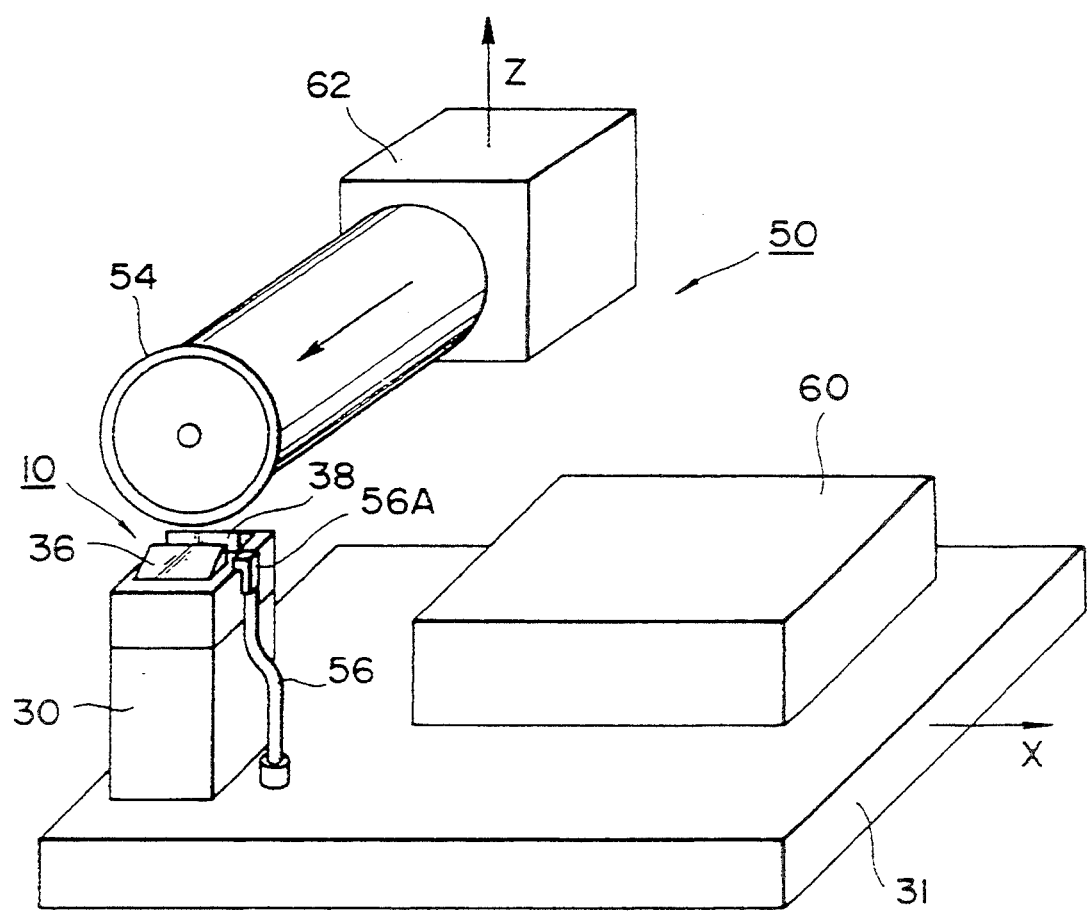
FIG. 6 is a perspective view which illustrates a state where the blade of the dicing apparatus is being detected by the blade position detection apparatus according to the present invention.

After a predetermined number of wafers 52 have been machined, air is ejected from the nozzle 56A for several seconds so as to blow the opposing surfaces 36A and 38A of the prisms 36 and 38 with air before the blade 54 is moved to the X-, Y- and Z-axial directions so as to be positioned between the prisms 36 and 38 of the blade position detection apparatus 10 (see FIG. 6). As a result, water droplet left on the opposing surfaces 36A and 38A of the prisms 36 and 38 are removed so that the opposing surfaces 36A and 38A of the prisms 36 and 38 are cleaned up. Hence, when light to be introduced from the prism 36 into the prism 38 passes through the opposing surfaces 36A and 38A of the prisms 36 and 38, light cannot be refracted or scattered by the water droplet.

A sequence so made that a water ejection mode and an air ejection mode are automatically changed over may be employed. As an alternative to this, the ejection operation may be manually performed.

Incidentally, reference numerals 60 shown in FIGS. 1, 3 and 6 represent a wafer table.

Figure 7:
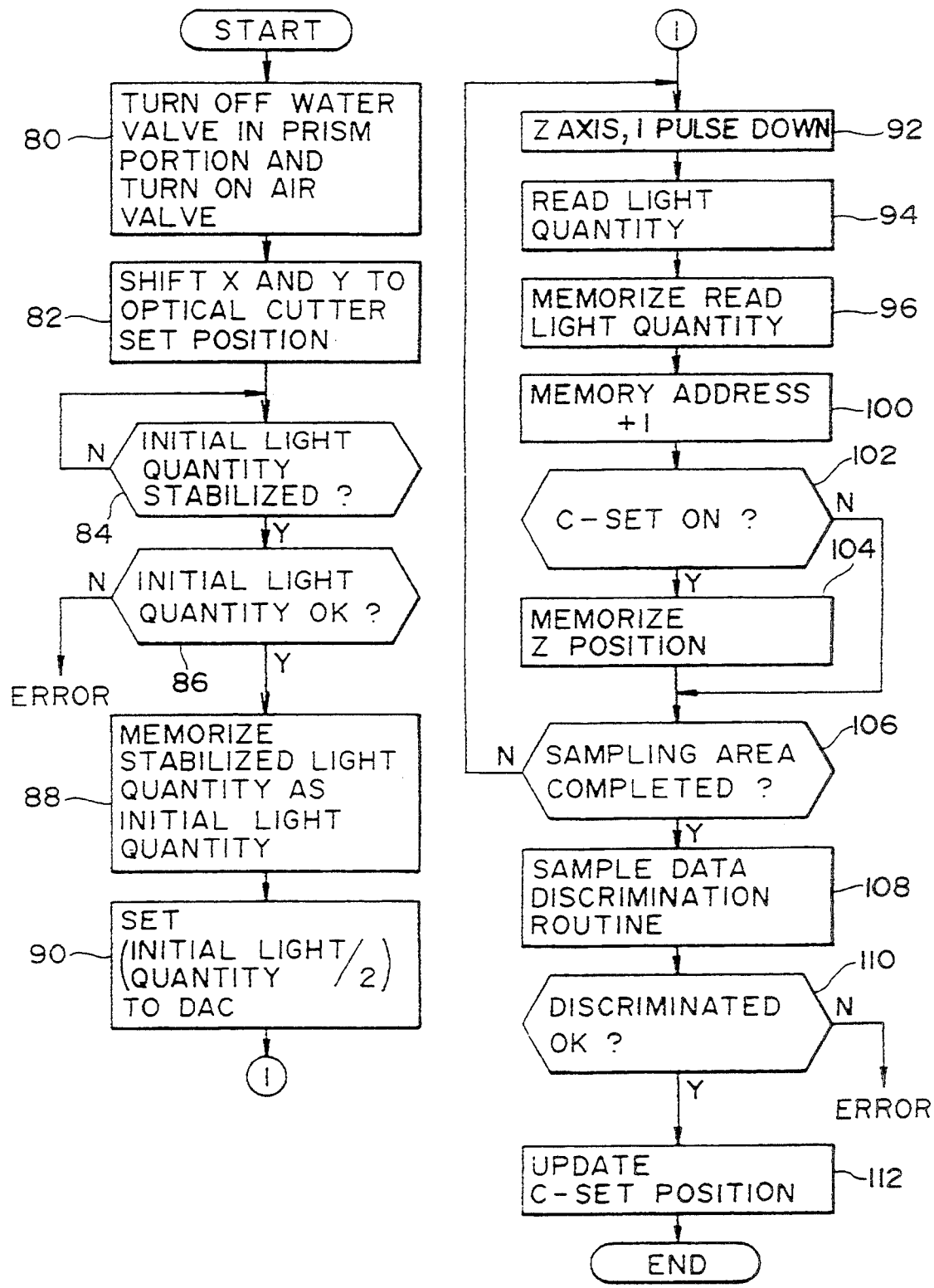
FIG. 7 is a flow chart which illustrates the operational state of the blade position detection apparatus according to the present invention.

Then, the operation of the thus constituted blade position detection apparatus according to the present invention will now be described with reference to a flow chart shown in FIG. 7.

During the period in which the wafer is being machined, water is ejected from the nozzle 63 toward the machining position at which the blade 54 machines the wafer 52. After a predetermined number of wafers 52 have been machined, the ejection of water from the nozzle 56A is stopped before the blade 54 is positioned between the prisms 36 and 38 of the blade position detection apparatus 10. Then, air is jetted for several seconds from the nozzle 56A so as to blow the opposing surfaces 36A and 38A of the prisms 36 and 38 with air (step 80). Then, the blade 54 is moved in the Y- and Z-axial directions and as well as the base 31 is moved in the X-axial direction so that the blade 54 is set to the position at which it is inspected by the prisms 36 and 38 (step 82). Then, the light emitting diode 16 is alternately switched in response to the clock 12 between a state where the same is turned on and a state where the same is turned off, so that light quantity data transmitted from the amplifier 26 is read via the light quantity reading device 45A. Then, a fact that the light quantity data, which has been read, is continued for a predetermined time is waited for (step 84).

In this case, the ope-amplifier 22 removes the disturbance light and the electric noise and the like, and transmits the electric signal about only the light emitted from the light emitting diode 16.

After the light quantity data has been stabilized, a discrimination is made as to whether or not the read light quantity data exceeds a predetermined value (that is, light quantity data V1 which is obtainable when the prisms 36 and 38 are clean enough to inspect the blade 54)(step 86). Then, the thus read light quantity data is, as initial light quantity V0, recorded to a memory (step 88).

Then, a value of (V0/2) is set to the storage circuit 47 as the threshold value (step 90). After setting has been completed, the blade 54 is moved downwards by a degree corresponding to one pulse (the same is downwards moved in the direction Z), and the quantity of the displacement of the blade 54 is read by the blade displacement reading device 45B (step 92). Furthermore, light quantity data at the aforesaid position is read (step 94). After read light quantity data has been recorded to the memory (step 96), 1 is added to a memory address (step 100).

Then, the operations in step 92 to step 106 are repeated until the overall sampling area (that is, the area irradiated with the light beams reflected by the prism 36) 102 shown in FIG. 6 is shielded from light by the blade 54.

During the aforesaid repetition, the light quantity data starts decreasing at the position at which the blade 54 is downwards moved and reaches the sampling area 102. Then, when the light quantity data has agreed with the threshold value, the C-SET signal is transmitted from the one-shot 76 via the comparator 74 shown in FIG. 1. Assuming that the position of the blade 54 at the time of the transmission of the C-SET signal is received in a receiving means and the aforesaid position is set to the reference position Zc for the blade 54, the relative difference Zd from surface position Zt of the work table 60, which has been previously obtained, is stored (that is, $Zd = |Zc - Zt|$).

In a case where the surface position Zt of the aforesaid wafer table 60 is obtained, the blade 54 is brought into contact with the wafer table 60 so as to electrically connect the blade 54 and the wafer table 60 to each other, and the position of the blade 54 at this time is detected so that the position is made to be the surface position Zt. If the relative difference Zd is once stored, position Zt (that is, $Zt = |Zc - Zd|$), at which a new blade comes in contact with the wafer table 60, can be calculated in accordance with the stored relative difference Zd in such a manner that reference position Zc' is detected even if the blade 54 has been changed for the new blade having a different outer diameter. As a result, the quantity of the wafer 52 left from cutting can be made to be a predetermined value.

Figure 8:
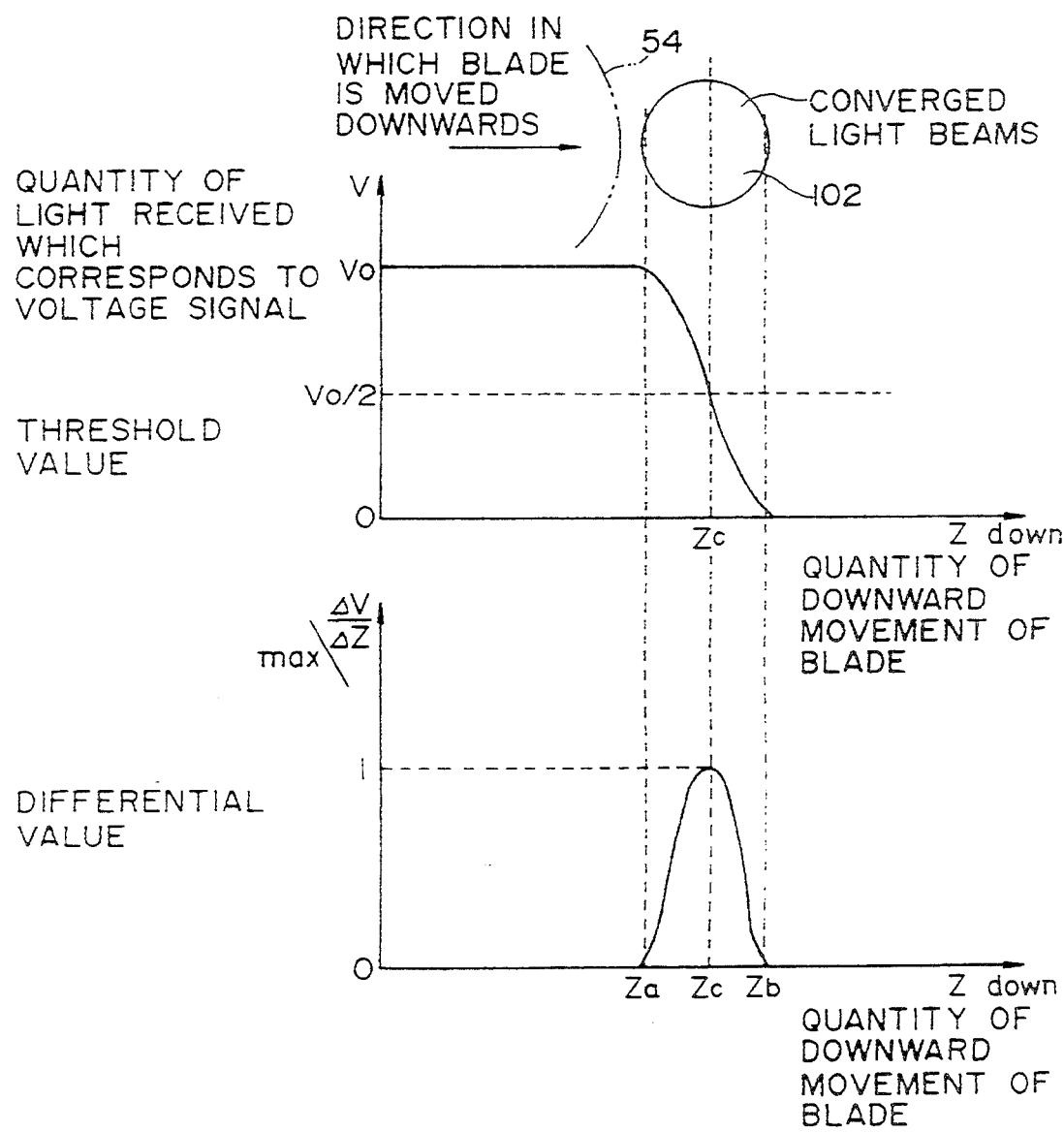
FIG. 8 is a graph which illustrates results of measurements performed in a case where an optical system of the blade position detection apparatus according to the present invention is not contaminated.

When the blade 54 has been further downwards moved, the overall area of the sampling area 102 is shielded from light and therefore the light quantity data becomes 0. When the blade is moved downwards as described above, the facts that the outer diameter of the blade 54 is sufficiently large as compared with the diameter of the sampling area 102 and that the opposing surfaces of the prisms 36 and 38 are kept clean will cause the position of Zc to be positioned between a position (Za) at which the light quantity data starts decreasing and a position (Zb) at which the light quantity data becomes 0 (see FIG. 8). That is a relationship expressed by $(Za + Zb)/2$ Zc is held.

The relationship between the values obtained by dividing each differential value ($\Delta V/\Delta Z$), which has been obtained by differentiating the aforesaid curve (V−Z), by (the maximum differential value) and the position Z of the blade 54 substantially agrees with the shape of a curve ($\Delta V/\Delta Z - Z$), which has been previously input, the shape being a shape realized when the prisms 36 and 38 are clean. In this case, a discrimination can be made that the prisms 36 and 38 are kept clean (that is, they are in a range in which a satisfactory measuring accuracy can be obtained). Therefore, the position Zc of the blade 54 at the time of the transmission of the C-SET signal is set to the position at which the blade 54 cuts the wafer, the blade is moved on the wafer 52 to reach the reference position, and the surface position Zt of the wafer table 60 is calculated in accordance with the relative difference Zd which has been previously obtained. Then, the blade 54 is moved onto the wafer 52 before the blade 54 is moved downwards to a position, at which a predetermined quantity of the wafer 52 left from cutting can be kept, so that the wafer 52 is cut.

Figure 9:
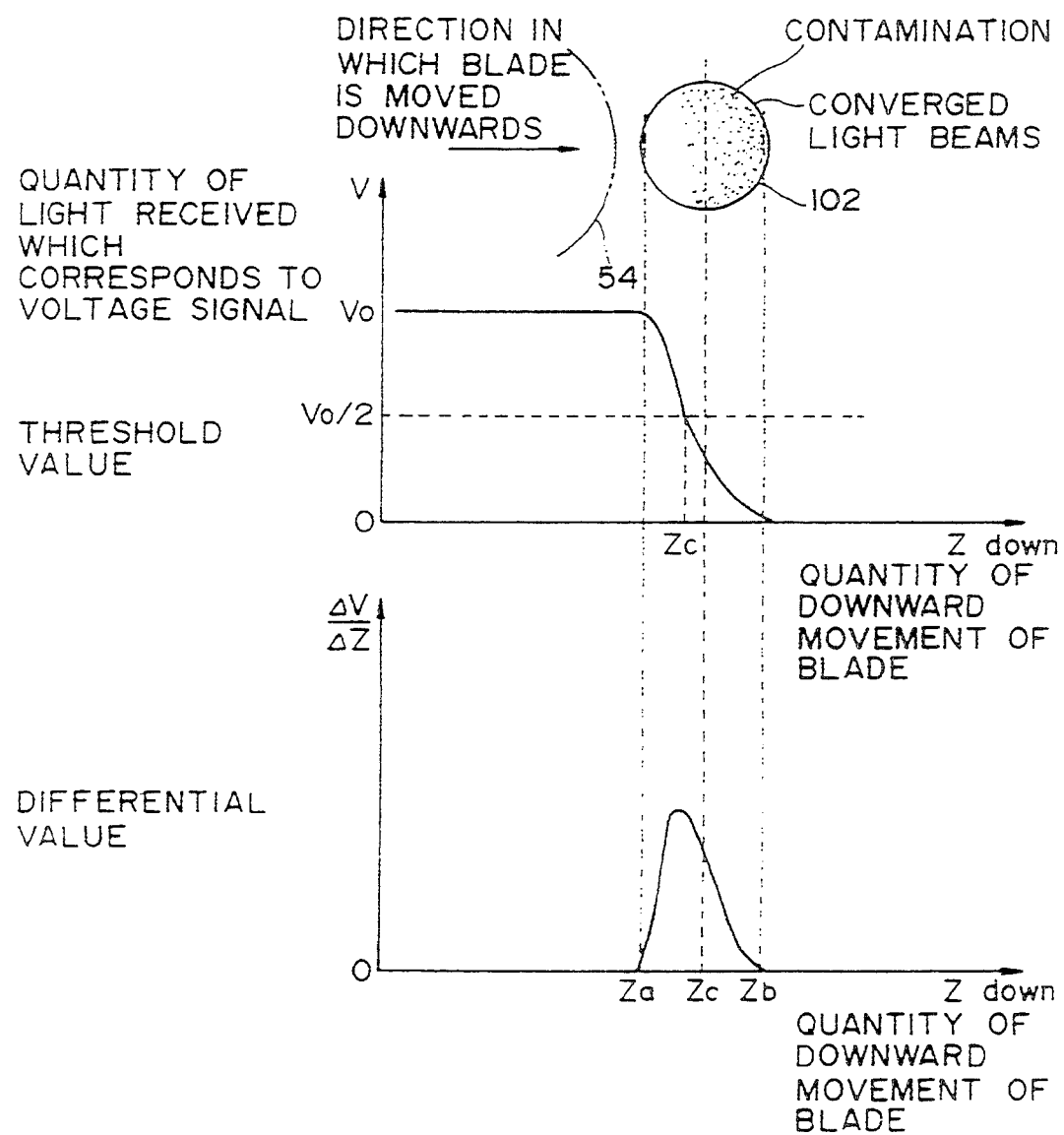
FIG. 9 is a graph which illustrates results of measurements performed in a case where an optical system of the blade position detection apparatus according to the present invention is contaminated non-uniformly.

In a case where the opposing surfaces of the prisms 36 and 38 are non-uniformly contaminated, Zc cannot be positioned between Za and Zb as shown in FIG. 9, and also the curve ($\Delta V/\Delta Z - Z$) is deviated from the shape of the curve ($\Delta V/\Delta Z - Z$) which has been previously input. Therefore, a discrimination is made that the coordinate position of Zc in this case is not reliable, and an error process is performed (steps 108 and 110).

Figure 10:
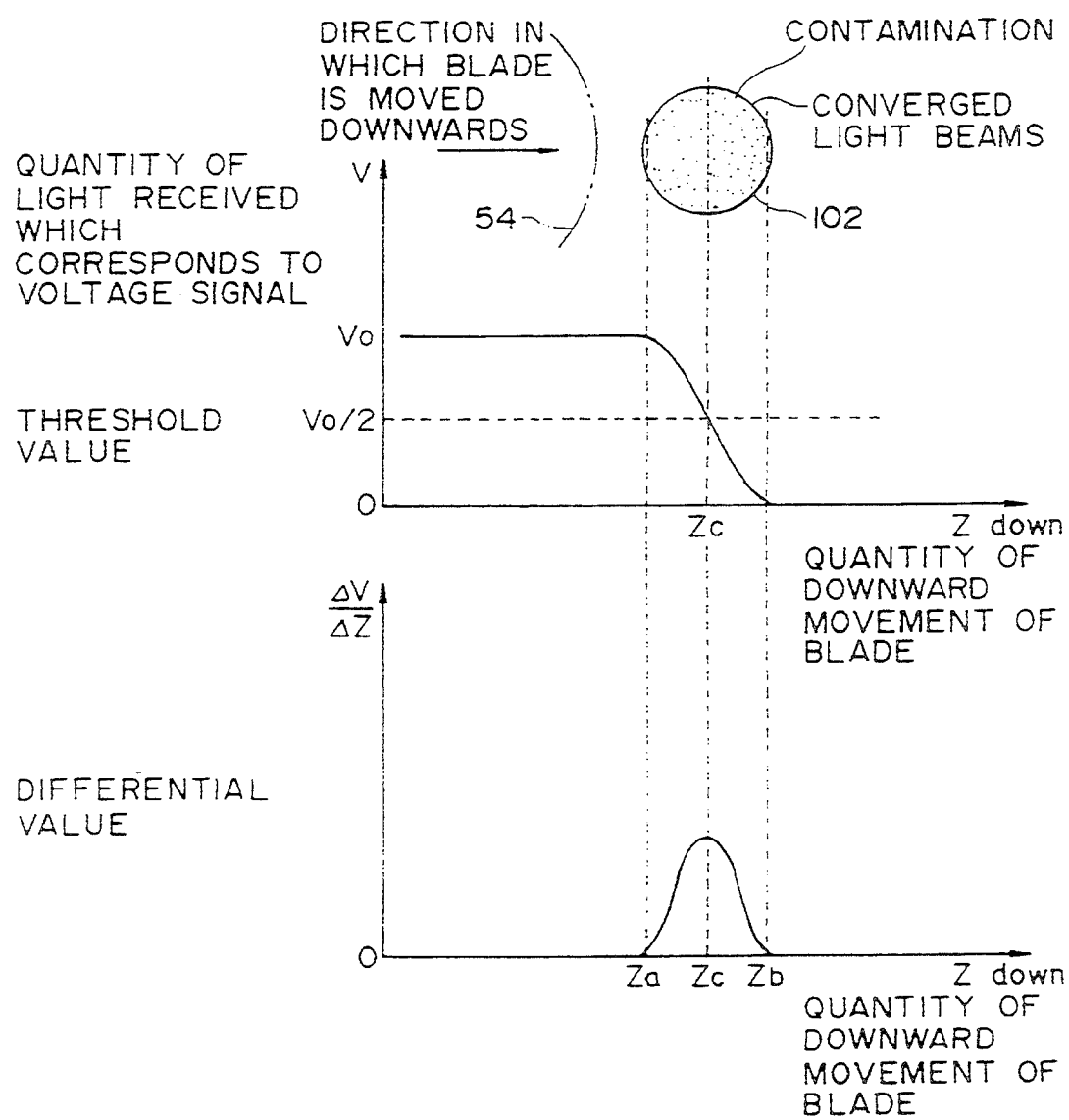
FIG. 10 is a graph which illustrates results of measurements performed in a case where an optical system of the blade position detection apparatus according to the present invention is contaminated non-uniformly.

In a case where the opposing surfaces of the prisms 36 and 38 are substantially uniformly contaminated, Zc is positioned between Za and Zb as shown in FIG. 10, and also the curve ($\Delta V/\Delta Z - Z$) substantially agrees with the shape of the curve ($\Delta V/\Delta Z - Z$) which has been previously input. Therefore, if the contamination is made substantially uniformly, and even if the read initial light quantity V0 is lower than a predetermined value (that is, light quantity data at the time when the prisms 36 and 38 are kept sufficiently clean to inspect the blade 54), a certain degree (that is, a range in which a satisfactory repetitive accuracy can be obtained) can be brought into an allowable range. Therefore, Zc in this case is set to be the reference position for the blade 54. However, if the read initial light quantity V0 is lower than the aforesaid predetermined value by a certain degree, a discrimination of an error is made in step 86.

As described above, the blade position detection apparatus according to the present invention enables the subject machine to recognize its condition change taken place due to the contamination of the optical passage of the optical sensor and the unstable state realized due to an adhesion of water droplets so that the machine can be cause to follow the changing state, or, if the satisfactory conditions cannot be met, the process can be again performed or an error process can be performed. Hence, disturbance light acting on the optical sensor or noise generated from the optical sensor can be removed and therefore the sensitivity of the optical sensor can be maintained at a constant level. Therefore, the quantity of the wear of the blade can be accurately measured, causing the front portion of the blade to be positioned accurately.

Although the aforesaid embodiment is so arranged that the threshold value is set to the initial light quantity V0/2, another value may be set to be the threshold value.

Although the aforesaid embodiment is so arranged that the space is reduced by using the prisms 36 and 38 to constitute the blade position detection apparatus 10, the present invention is not limited to this. For example, the prisms 36 and 38 may be omitted from the structure.

Incidentally, the blade position detection apparatus according to the present invention enables a confirmation to be made as to whether or not the spot diameter of the light beam has been contracted to a degree with which the optical system is able to obtain a satisfactory repetitive accuracy by checking the difference |Za−Zb| between the size Za of the sampling area of the converged light beams 102 and the size Zb of the measured light beams 102.

As described above, according to the blade position detection apparatus and a method of discriminating the reliability of it, the displacement position of the rotational blade at the time of the transmission of a signal made by the means for transmitting the signal is set to be the correction position determined by taking the wear or the like of the rotational blade into consideration. Therefore, in a case where the quantity of the wear of the blade has been changed depending upon the conditions such as the type of the wafer to be machined, the scatter of the blades, and the quantity of cutting and the like, the rotational blade can be located in a non-contact manner, that is, the front portion of the rotational blade can be accurately located while eliminating a necessity of bringing the blade into contact with the machining table.

Furthermore, the disturbance light and the noise can be removed, so that the accuracy of locating the blade can be improved.

In addition, the blade position detection apparatus according to the present invention is able to cause the mist including cutting dust generated during the process of machining the wafer not to adhere to the opposing surfaces of two optical system. Therefore, the opposing surfaces of the optical systems can be kept clean so that the light quantity introduced from the optical system of a pair of the optical systems to the light receiving means via the opposite surface of the residual optical system can be maintained at a constant value.

Therefore, in a case where the quantity of the wear of the rotational blade has been changed depending upon the conditions such as the type of the wafer to be machined, the scatter of the rotational blades, and the quantity of cutting and the like, the rotational blade can be located in a non-contact manner, that is, the front portion of the rotational blade can be accurately located while eliminating a necessity of bringing the rotational blade into contact with the machining table.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of discriminating reliability of a blade position detection apparatus having light emitting means having a transparent emitting surface and emitting light via said emitting surface, light receiving means having a transparent incidental surface positioned to oppose said emitting surface at a predetermined interval and receiving light made incident via said incidental surface so as to photoelectrically convert said light, first detection means for detecting the position of the front portion of a rotational blade to be inserted into a portion between said light emitting means and said light receiving means, second detection means for, in accordance with an output from said light receiving means, detecting a fact that said rotational blade has been inserted into a predetermined position between said light emitting means and said light receiving means; and means for receiving said position of the front portion of said rotational blade detected by said first detection means at the time of detection performed by said second detection means, so that said front end portion of said rotational blade is located with respect to a subject to be machined in accordance with said received position of the front portion of said rotational blade, said method of discriminating reliability of a blade position detection apparatus comprising the steps of:

photoelectrically converting a light quantity received by said light receiving means when said rotational blade is positioned at a position at which light is shielded into voltage signal V0;

storing voltage signal V and displacement Z of said rotational blade obtainable from said light receiving means whenever said rotational blade is moved by a predetermined quantity in a direction in which light converged within an interval between said light emitting means and side light receiving means is shielded in a case where said voltage signal V0 substantially agrees with voltage signal V1 obtainable when said emitting surface and said incidental surface, which have been previously stored, are kept clean;

obtaining the relationship between said stored voltage signal V and said displacement Z of said rotational blade;

discriminating a fact that said emitting surface and said incidental surface are clean in a case where said obtained relationship substantially agrees with the relationship between voltage signal V and position Z of said rotational blade realized when said emitting surface and said incidental surface are clean, and making said received position of said front end of said rotational blade to be effective.

2. A method of discriminating reliability of a blade position detection apparatus according to claim 1, wherein said second detection means has storage means for storing the half value of a voltage signal as threshold value V0/2 assuming that said voltage signal obtainable from said light receiving means when said rotational blade is position at a position at which light is shielded is V0, so that the moment at which said voltage signal obtainable from said light receiving means agrees with said threshold value V0/2 is detected.

3. A method of discriminating reliability of a blade position detection apparatus according to claim 1, wherein the relationship between said stored light quantity V received by said light receiving means and said displacement Z of said rotational blade can be expressed by differential value $\Delta V/\Delta Z$ and said displacement Z of said rotational blade.

* * * * *